United States Patent
Deng et al.

(10) Patent No.: US 8,437,311 B2
(45) Date of Patent: May 7, 2013

(54) PILOT-MEASUREMENT CONTROL METHOD AND DUAL-MODE TERMINAL

(75) Inventors: Minzhi Deng, Shenzhen (CN); Mingxia Xu, Shenzhen (CN); Xin Zhong, Shenzhen (CN); Shuhui Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/117,992

(22) Filed: May 27, 2011

(65) Prior Publication Data

US 2011/0249587 A1 Oct. 13, 2011

Related U.S. Application Data

(63) Continuation of application No. PCT/CN2009/075164, filed on Nov. 27, 2009.

(30) Foreign Application Priority Data

Nov. 28, 2008 (CN) .......................... 2008 1 0178380

(51) Int. Cl.
*H04W 4/00* (2009.01)
*H04W 36/00* (2009.01)
(52) U.S. Cl.
USPC .................. 370/331; 455/432.1; 455/436
(58) Field of Classification Search .................. 370/320, 370/331–335, 342, 465–466; 455/422.1–433, 455/436–443, 435.1–435.2
See application file for complete search history.

(56) References Cited

U.S. PATENT DOCUMENTS

| | | | | |
|---|---|---|---|---|
| 2006/0109817 A1* | 5/2006 | Ramanna et al. | ............. | 370/331 |
| 2006/0109818 A1* | 5/2006 | Ramanna et al. | ............. | 370/331 |
| 2006/0126564 A1* | 6/2006 | Ramanna et al. | ............. | 370/331 |
| 2007/0064648 A1 | 3/2007 | Kim et al. | | |
| 2007/0066273 A1 | 3/2007 | Laroia et al. | | |

(Continued)

FOREIGN PATENT DOCUMENTS

| CN | 1529434 A | 9/2004 |
|---|---|---|
| CN | 1859310 A | 11/2006 |

(Continued)

OTHER PUBLICATIONS

Written Opinion of the International Searching Authority issued in corresponding PCT Patent Application No. PCT/CN2009/075164, mailed Feb. 11, 2010.

(Continued)

*Primary Examiner* — Thai Hoang
(74) *Attorney, Agent, or Firm* — Conley Rose, P.C.; Grant Rodolph; Nicholas K. Beaulieu (57) ABSTRACT

A pilot-measurement control method and a dual-mode terminal are provided. After entering a tunnel state, an idle state protocol submodule does not wait for a measurement start command to trigger pilot measurement, but instead, directly triggers pilot measurement by actively searching for high rate packet data (HRPD) measurement permission variable information. Alternatively, measurement indication information sent by an initialization protocol submodule is buffered in advance, so that after entering the tunnel state, the idle state protocol submodule can trigger pilot measurement by searching for the buffered information. Alternatively, the idle state protocol submodule performs pilot measurement according to received measurement indication information sent by an air interface connection management protocol submodule when the idle state protocol submodule is activated.

10 Claims, 3 Drawing Sheets

U.S. PATENT DOCUMENTS

| | | | |
|---|---|---|---|
| 2007/0195740 A1* | 8/2007 | Bhushan et al. | 370/335 |
| 2008/0089293 A1 | 4/2008 | Madour et al. | |
| 2008/0144574 A1 | 6/2008 | Jayapalan et al. | |
| 2008/0259869 A1 | 10/2008 | Wang et al. | |
| 2009/0022104 A1 | 1/2009 | Cherian et al. | |
| 2010/0046477 A1 | 2/2010 | Marin et al. | |
| 2011/0249587 A1 | 10/2011 | Deng et al. | |
| 2012/0033576 A1* | 2/2012 | Deng et al. | 370/252 |

FOREIGN PATENT DOCUMENTS

| | | |
|---|---|---|
| CN | 1879324 A | 12/2006 |
| CN | 101009907 | 8/2007 |
| CN | 101039507 | 9/2007 |
| CN | 101098546 A | 1/2008 |
| CN | 101438510 A | 5/2009 |
| EP | 1916865 A2 | 10/2007 |

OTHER PUBLICATIONS

International Search Report issued in corresponding PCT Patent Application No. PCT/CN2009/075164, mailed Feb. 11, 2010.

3GPP2, "cdma2000 High Rate Packet Data Air Interface Specification". Version 2, Mar. 2007. C.S0024-B.

Office Action issued in commonly owned U.S. Appl. No. 13/275,064, mailed Jan. 19, 2012.

* cited by examiner

PILOT-MEASUREMENT CONTROL METHOD AND DUAL-MODE TERMINAL

CROSS-REFERENCE TO RELATED APPLICATIONS

This application is a continuation of International Application No. PCT/CN2009/075164, filed on Nov. 27, 2009, which claims priority to Chinese Patent Application No. 200810178380.2, filed on Nov. 28, 2008, both of which are hereby incorporated by reference in their entireties.

FIELD OF THE INVENTION

The present invention relates to the field of communications technology, and more particularly to a pilot-measurement control method and a dual-mode terminal.

BACKGROUND OF THE INVENTION

Since 1990s, code division multiple access (CDMA) systems have gained wide attention, and many relevant studies have been carried out. CDMA2000 is one of mainstream third generation (3G) technologies, which has already become commercially available all over the world. CDMA2000-1X is the first phase of the development of CDMA2000 systems, is corresponding to protocol versions "CDMA2000 Release 0", "CDMA2000 Release A" and "CDMA2000 Release B", and is backward compatible with the existing Interim Standard (IS)-95. A high data rate (HDR) technology is accepted by the Telecommunications Industry Association (TIA)/Electronic Industries Association (EIA) as an IS-856 standard (Release 0). The HDR technology is also referred to as high rate packet data (HRPD) or 1x EV-DO, in which 1X means that the HRPD technology uses the same radio frequency bandwidth and chip rate as CDMA2000 1X systems, and has good backward compatibility; EV (evolution) means that the HRPD technology is an evolved version of CDMA2000 1X; DO (data optimization) means that the HRPD technology specifically optimized for packet data services. 1x EV-DO is accepted by the International Telecommunication Union—Recommendation (ITU-R) as one of 3G technology standards.

In addition, a long term evolution (LTE) technology is regarded as a mainstream technology of fourth generation (4G) mobile communication systems. The LTE system adopts orthogonal frequency division multiple access (OFDMA) and multiple input multiple output (MIMO) technologies, and therefore can greatly improve spectrum utilization and capacity of a communication system. Moreover, the LTE technology can better support large data download services such as the Voice over Internet Protocol (VoIP) or video calling. The LTE technology is regarded as a mainstream next-generation technology, and therefore, some leading CDMA/HRPD operators decide to gradually upgrade the existing HRPD networks to LTE networks. During a network upgrade process, some users need to use an HRPD-LTE dual-mode terminal to perform full network roaming because two types of networks HRPD and LTE coexist, with the LTE network having a partial coverage and the HRPD network having a complete coverage.

An optimized LTE-HRPD handover means that when a dual-mode terminal enters an edge zone covered by an LTE network, an HRPD module in the dual-mode terminal performs network registration in advance through a tunnel between the LTE network and the HRPD network, so that when the dual-mode terminal leaves the LTE coverage area and an LTE-HRPD handover is performed, because no operation such as registration is required, the handover speed can be greatly increased, and the call drop rate can be greatly reduced, thereby improving the conversation quality. During the optimized LTE-HRPD handover, after the HRPD module completes pre-registration, that is, completes initialization of an HRPD protocol, an LTE module in the dual-mode terminal needs to periodically enable the HRPD module to perform pilot measurement on the HRPD network and report a measurement result to the LTE network, so that the LTE network makes a handover decision.

SUMMARY OF THE INVENTION

An embodiment of the present invention provides a pilot-measurement control method, which includes the following steps:

In a process for a dual-mode terminal to hand over from a non-HRPD network to an HRPD network, after an idle state protocol submodule in an HRPD module of the dual-mode terminal enters a tunnel state, the idle state protocol submodule controls pilot measurement according to measurement identification information.

In an embodiment, the present invention provides a dual-mode terminal, which includes a non-HRPD module and an HRPD module. The HRPD module includes an idle state protocol submodule. The idle state protocol submodule is configured to control pilot measurement after entering a tunnel state, by detecting HRPD measurement permission variable information, or by detecting measurement indication information stored in a buffer memory, or according to measurement indication information sent by an air interface connection management protocol submodule in the HRPD module of the dual-mode terminal, where the measurement indication information is sent when the air interface connection management protocol submodule activates the idle state protocol submodule.

In an embodiment, the present invention provides a pilot-measurement control device, which includes an HRPD module. In a network handover process of the pilot-measurement control device from a non-HRPD network to an HRPD network, after an idle state protocol submodule in the HRPD module of the pilot-measurement control device enters a tunnel state, the idle state protocol submodule controls pilot measurement according to measurement identification information.

DETAILED DESCRIPTION OF THE EMBODIMENTS

The technical solutions of the present invention are further illustrated in the following with reference to the accompanying drawings and specific embodiments.

With the ongoing development of network technologies, on the basis of the original HRPD network, a variety of wireless communication networks are added in succession, such as an LTE network, a Worldwide Interoperability for Microwave Access (WiMAX) network, a Universal Mobile Telecommunications System (UMTS) network, and an Ultra Mobile Broadband (UMB) network. The embodiments of the present invention are illustrated by taking the dual network coverage of a non-HRPD network represented by an LTE network and an HRPD network as an example. In order to adapt to the coexistence of two types of networks LTE and HRPD during the network upgrade process, a user uses an HRPD-LTE dual-mode terminal to perform full network roaming. When the dual-mode terminal resides in the LTE network, an LTE module in the terminal works, and when the dual-mode terminal leaves the LTE network and enters the HRPD network, an HRPD module in the terminal works. When the dual-mode terminal moves from the LTE network to the HRPD network, the terminal needs to be handed over from the LTE network to the HRPD network, in order to perform normal communication services. Specifically, when the dual-mode terminal enters an edge zone covered by the LTE network, the HRPD module in the dual-mode terminal performs network registration in advance through a tunnel between the LTE network and the HRPD network. After the HRPD module completes pre-registration and completes initialization of an HRPD protocol, an initialization protocol submodule completes network capture, and an idle state protocol submodule enters a tunnel state, some drawbacks occur, such as abnormal operation and handover failure of the terminal due to failure to receive a measurement start command sent by the initialization protocol submodule again. To avoid such drawbacks, a pilot-measurement control method provided in an embodiment includes: in a network handover process of a dual-mode terminal from a non-HRPD network to an HRPD network, after an idle state protocol submodule in an HRPD module of the dual-mode terminal enters a tunnel state, the idle state protocol submodule controls pilot measurement according to measurement identification information. Specifically, the idle state protocol submodule controls pilot measurement by detecting HRPD measurement permission variable information set by the initialization protocol submodule. Alternatively, the HRPD module detects information in a buffer memory. If measurement indication information is stored in the buffer memory, the HRPD module controls pilot measurement according to the measurement indication information. Alternatively, an air interface connection management protocol submodule in the HRPD module activates the idle state protocol submodule and at the same time sends measurement indication information to the idle state protocol submodule, so that the idle state protocol submodule controls pilot measurement according to the measurement indication information.

In the pilot-measurement control method provided in this embodiment, after entering the tunnel state, the idle state protocol submodule does not wait for the measurement start command to trigger pilot measurement, but instead, directly triggers pilot measurement by actively searching for the HRPD measurement permission variable information. Alternatively, measurement indication information sent by the initialization protocol submodule is buffered in advance, so that the idle state protocol submodule can trigger pilot measurement by searching for the buffered information, after entering the tunnel state. Alternatively, the idle state protocol submodule controls pilot measurement according to the measurement indication information received from the air interface connection management protocol submodule, in which the measurement indication information is received when the idle state protocol submodule is activated. In the embodiment of the present invention, the following problems may be prevented: The idle state protocol submodule of the HRPD module in the dual-mode terminal fails to perform pilot measurement after entering the tunnel state if the LTE module already sends the measurement start command but does not send a measurement stop command. This ensures that the idle state protocol submodule performs normal pilot measurement in the LTE-HRPD handover process of the dual-mode terminal, thereby increasing the handover success rate, ensuring normal operation of the system, and improving the service quality.

Figure 1:
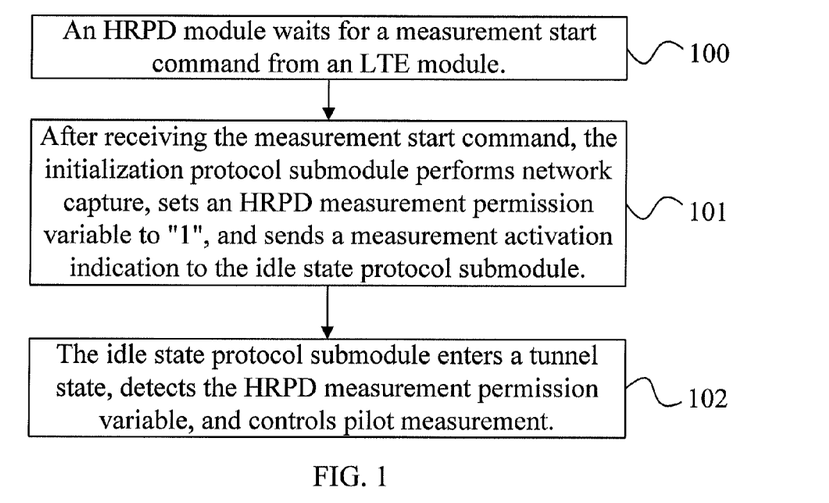
FIG. 1 is a flow chart of a pilot-measurement control method according to a first embodiment of the present invention.

In the embodiment, the controlling, by the idle state protocol submodule, pilot measurement by detecting the HRPD measurement permission variable information includes: detecting, by the idle state protocol submodule, the HRPD measurement permission variable information, and if the HRPD measurement permission variable information indicates that measurement is permitted, for example, the HRPD measurement permission variable is set to "1" indicating that measurement is permitted, enabling a pilot-measurement submodule in the HRPD module to perform pilot measurement; if the HRPD measurement permission variable information indicates that measurement is not permitted, for example, the HRPD measurement permission variable is set to "0" indicating that measurement is not permitted, disabling the pilot-measurement submodule to stop pilot measurement. In each embodiment of the present invention, the related HRPD measurement permission variable is a common variable in the HRPD module. The HRPD measurement permission variable information may be accessed not only by the initialization protocol submodule, but also by the idle state protocol submodule. FIG. 1 is a flow chart of a pilot-measurement control method according to a first embodiment of the present invention. As shown in FIG. 1, the method specifically includes the following steps:

Step 100: An HRPD module waits for a measurement start command from an LTE module.

After a dual-mode terminal completes pre-registration and an air interface connection management protocol submodule is enabled, the HRPD module waits for the measurement start command from the LTE module. At this time, an initialization protocol submodule is in a network selection state, which is one of activated states including the network selection state, a pilot measurement state, and a time synchronization state. An idle state protocol submodule is in a non-activated state.

Step 101: After receiving the measurement start command, the initialization protocol submodule performs network capture, sets an HRPD measurement permission variable to "1", and sends a measurement activation indication to the idle state protocol submodule.

The LTE module sends the measurement start command to the HRPD module, and the initialization protocol submodule starts a network capture process. The network capture process enters the network selection state, the pilot measurement state, and the time synchronization state in sequence. After the HRPD module receives the measurement start command sent by the LTE module, the initialization protocol submodule immediately sets the HRPD measurement permission variable to "1" indicating that at this time measurement is permitted, and sends the measurement activation indication to the idle state protocol submodule. At this time, the idle state protocol submodule is in the non-activated state and therefore does not perform any operation.

Step 102: The idle state protocol submodule enters a tunnel state, detects the HRPD measurement permission variable, and controls pilot measurement.

After completing the network capture process, the initialization protocol submodule enters a non-activated state, and the HRPD module enters an idle state, and at this time, the idle state protocol submodule is activated and enters the tunnel state. At this time, the idle state protocol submodule detects the HRPD measurement permission variable. If the variable is "1", the idle state protocol submodule enables a pilot-measurement submodule to perform measurement. If the variable is "0", the idle state protocol submodule disables the pilot-measurement submodule to stop measurement. Here, as the variable is "1", the idle state protocol submodule enables the pilot-measurement submodule to perform measurement.

Figure 2:
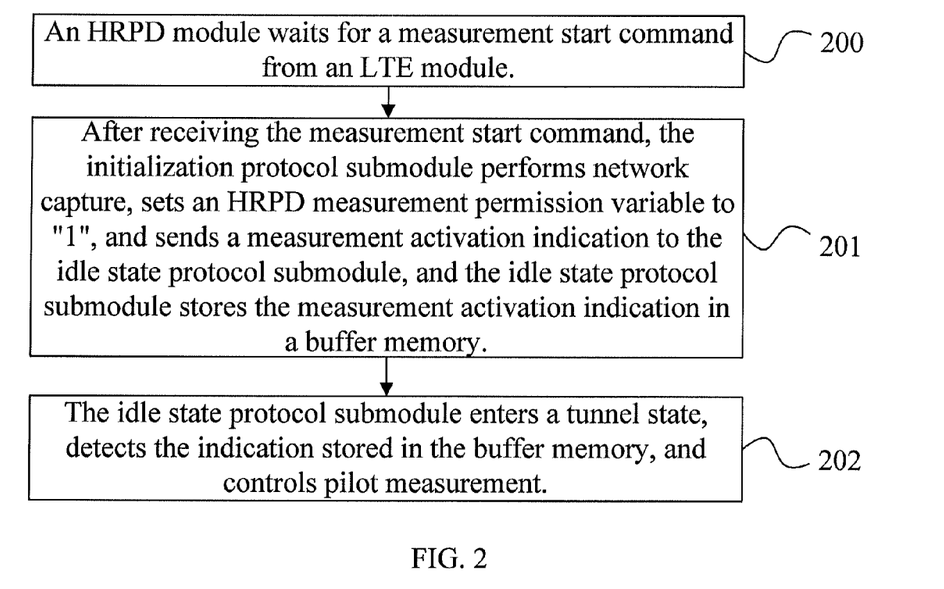
FIG. 2 is a flow chart of a pilot-measurement control method according to a second embodiment of the present invention.

In the embodiment, the controlling, by the idle state protocol submodule, pilot measurement by detecting the measurement indication information stored in the buffer memory includes: detecting, by the idle state protocol submodule, the measurement indication information stored in the buffer memory, and if the measurement indication information indicates that measurement is permitted, enabling a pilot-measurement submodule to perform pilot measurement; if the measurement indication information indicates that measurement is not permitted, disabling the pilot-measurement submodule to stop pilot measurement. FIG. 2 is a flow chart of a pilot-measurement control method according to a second embodiment of the present invention. As shown in FIG. 2, the method specifically includes the following steps:

Step 200: An HRPD module waits for a measurement start command from an LTE module.

After a dual-mode terminal completes pre-registration and an air interface connection management protocol submodule is enabled, the HRPD module waits for the measurement start command from the LTE module. At this time, an initialization protocol submodule is in a network selection state, which is one of activated states including the network selection state, a pilot measurement state, and a time synchronization state. An idle state protocol submodule is in a non-activated state.

Step 201: After receiving the measurement start command, the initialization protocol submodule performs network capture, sets an HRPD measurement permission variable to "1", and sends a measurement activation indication to the idle state protocol submodule, and the idle state protocol submodule stores the measurement activation indication in a buffer memory.

The LTE module sends the measurement start command, and the initialization protocol submodule starts a network capture process. The network capture process enters the network selection state, the pilot measurement state, and the time synchronization state in sequence. After the HRPD module receives the measurement start command sent by the LTE module, the initialization protocol submodule immediately sets the HRPD measurement permission variable to "1" indicating that at this time measurement is permitted, and sends the measurement activation indication to the idle state protocol submodule. The idle state protocol submodule receives the measurement activation indication information sent by the initialization protocol submodule, and stores the measurement indication information, that is, the measurement activation indication in a buffer memory.

Step 202: The idle state protocol submodule enters a tunnel state, detects the indication stored in the buffer memory, and controls pilot measurement.

After completing the network capture process, the initialization protocol submodule enters a non-activated state, and the HRPD module enters an idle state, and at this time, the idle state protocol submodule is activated and enters the tunnel state. At this time, the idle state protocol submodule detects whether the measurement activation indication or a measurement deactivation indication is buffered, and if the measurement activation indication is buffered, enables a pilot-measurement submodule to perform pilot measurement; if the measurement deactivation indication is buffered, disables the pilot-measurement submodule to stop pilot measurement. Here, because the measurement activation indication is buffered, the idle state protocol submodule enables the pilot-measurement submodule to perform pilot measurement. In this embodiment, after the LTE module sends the measurement start command to the initialization protocol submodule, the initialization protocol submodule sends the measurement activation indication to the idle state protocol submodule, that is, the initialization protocol submodule forwards the measurement activation indication to the idle state protocol submodule. The LTE module may also directly send the measurement start command to the idle state protocol submodule, and the forwarding process of the initialization protocol submodule is omitted.

Figure 3:
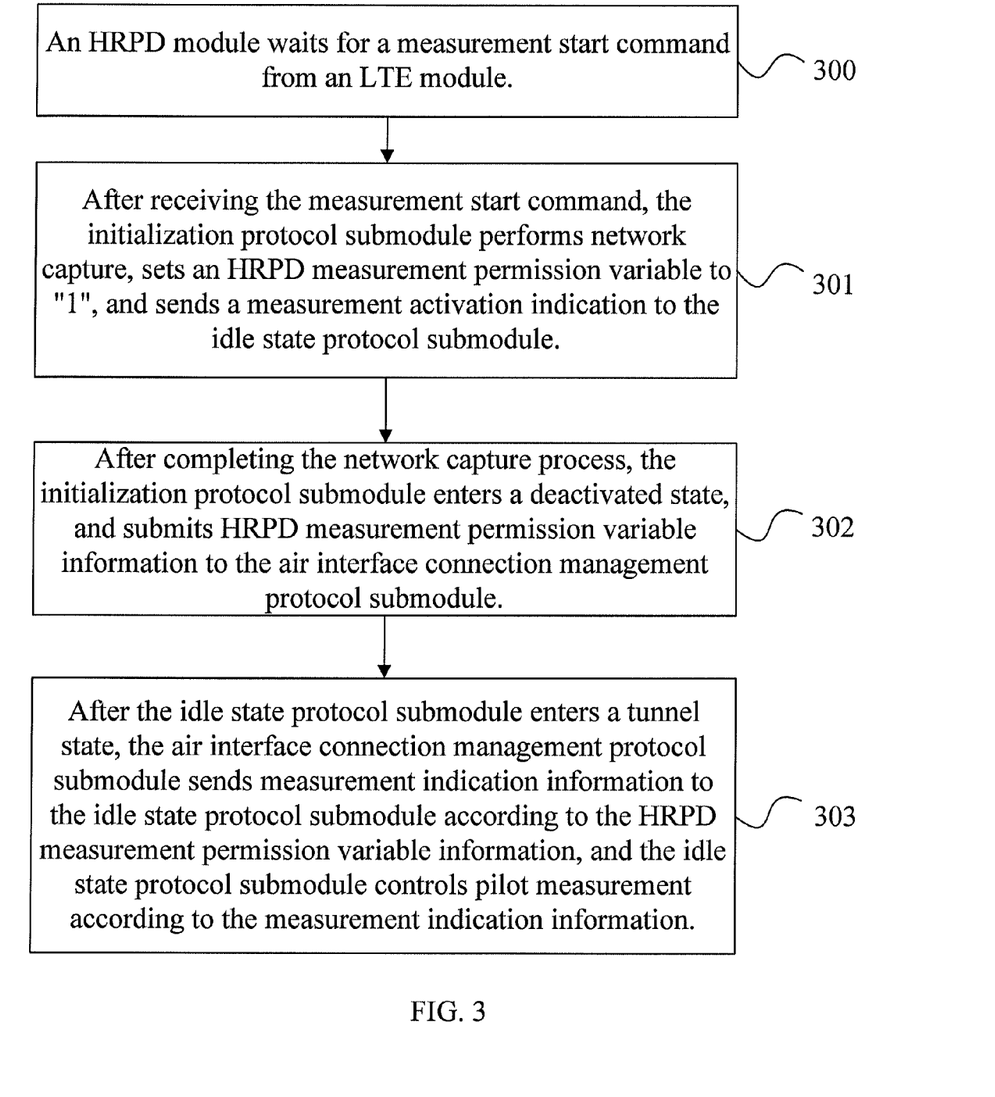
FIG. 3 is a flow chart of a pilot-measurement control method according to a third embodiment of the present invention.

In the embodiment, the controlling, by the idle state protocol submodule, pilot measurement according to the measurement indication information sent by the air interface connection management protocol submodule in the HRPD module of the dual-mode terminal, where the measurement indication information is sent when the air interface connection management protocol submodule activates the idle state protocol submodule includes: detecting, by the idle state protocol submodule, the measurement indication information sent by the air interface connection management protocol submodule in the HRPD module of the dual-mode terminal, where the measurement indication information is sent when the air interface connection management protocol submodule activates the idle state protocol submodule, and if the measurement indication information indicates that measurement is permitted, enabling the pilot-measurement submodule to perform pilot measurement; if the measurement indication information indicates that measurement is not permitted, disabling the pilot-measurement submodule to stop pilot measurement. FIG. 3 is a flow chart of a pilot-measurement control method according to a third embodiment of the present invention. As shown in FIG. 3, the method specifically includes the following steps:

Step 300: An HRPD module waits for a measurement start command from an LTE module.

After a dual-mode terminal completes pre-registration and an air interface connection management protocol submodule is enabled, the HRPD module waits for the measurement start command from the LTE module. At this time, an initialization protocol submodule is in a network selection state, which is one of activated states including the network selection state, a pilot measurement state, and a time synchronization state. An idle state protocol submodule is in a non-activated state.

Step 301: After receiving the measurement start command, the initialization protocol submodule performs network capture, sets an HRPD measurement permission variable to "1", and sends a measurement activation indication to the idle state protocol submodule.

The LTE module sends the measurement start command to the HRPD module, and the initialization protocol submodule starts a network capture process. The network capture process enters the network selection state, the pilot measurement state, and the time synchronization state in sequence. After the HRPD module receives the measurement start command sent by the LTE module, the initialization protocol submodule immediately sets the HRPD measurement permission variable to "1" indicating that at this time measurement is permitted, and sends the measurement activation indication to the idle state protocol submodule. At this time, the idle state protocol submodule is in the non-activated state and therefore does not perform any operation.

Step 302: After completing the network capture process, the initialization protocol submodule enters a non-activated state, and submits HRPD measurement permission variable information to the air interface connection management protocol submodule.

Step 303: After the idle state protocol submodule enters a tunnel state, the air interface connection management protocol submodule sends measurement indication information to the idle state protocol submodule according to the HRPD measurement permission variable information, and the idle state protocol submodule controls pilot measurement according to the measurement indication information.

The HRPD module enters an idle state, and at this time, the idle state protocol submodule is activated and enters the tunnel state. When activating the idle state protocol submodule, the air interface connection management protocol submodule sends the measurement indication information such as the measurement activation indication or a measurement deactivation indication to the idle state protocol submodule according to the HRPD measurement permission variable information previously submitted by the initialization protocol submodule. The measurement indication information may be sent after activation information for activating the idle state protocol submodule is sent, or the indication may also be carried in the activation information. After receiving the measurement activation indication, the idle state protocol submodule enables a pilot-measurement submodule to perform pilot measurement.

In the pilot-measurement control method provided in the embodiments, pilot measurement can be directly performed according to specific information after the idle state protocol submodule enters the tunnel state, thereby ensuring the handover success rate of the dual-mode terminal from the LTE network to the HRPD network and improving the service quality.

In the embodiments, the pilot measurement process may further include a situation where the LTE module sends a measurement stop command to the HRPD module when the LTE module requires the HRPD module to stop measurement due to some reasons. The initialization protocol submodule is in the non-activated state and therefore does not perform any operation except setting the HRPD measurement permission variable to "0" and sending a measurement deactivation indication to the idle state protocol submodule. After receiving the indication, the idle state protocol submodule disables the pilot-measurement submodule to stop measurement. Then, if the LTE module requires the HRPD module to start measurement again due to some reasons, the LTE module sends a measurement start command to the HRPD module again. The initialization protocol submodule is in the non-activated state and therefore does not perform any operation except setting the HRPD measurement permission variable to "1" and sending a measurement activation indication to the idle state protocol submodule. After receiving the measurement activation indication, the idle state protocol submodule enables the pilot-measurement submodule to perform pilot measurement, and the measurement is not stopped until a measurement stop command from the LTE module is received. In addition, in another situation, the initialization protocol submodule already starts the network capture process and receives the measurement stop command before the network capture process is completed. At this time, the network capture process is not stopped, but the initialization protocol submodule sends a measurement deactivation indication to the idle state protocol submodule.

Persons of ordinary skill in the art should understand that all or a part of the steps of the method according to the embodiments of the present invention may be implemented by a program instructing relevant hardware. The program may be stored in a computer readable storage medium. When the program runs, the steps of the method according to the embodiments of the present invention are performed. Storage medium may be any medium that is capable of storing program codes, such as a Read-Only Memory (ROM), a Random Access Memory (RAM), a magnetic disk, or a Compact Disk Read-Only Memory (CD-ROM).

Figure 4:
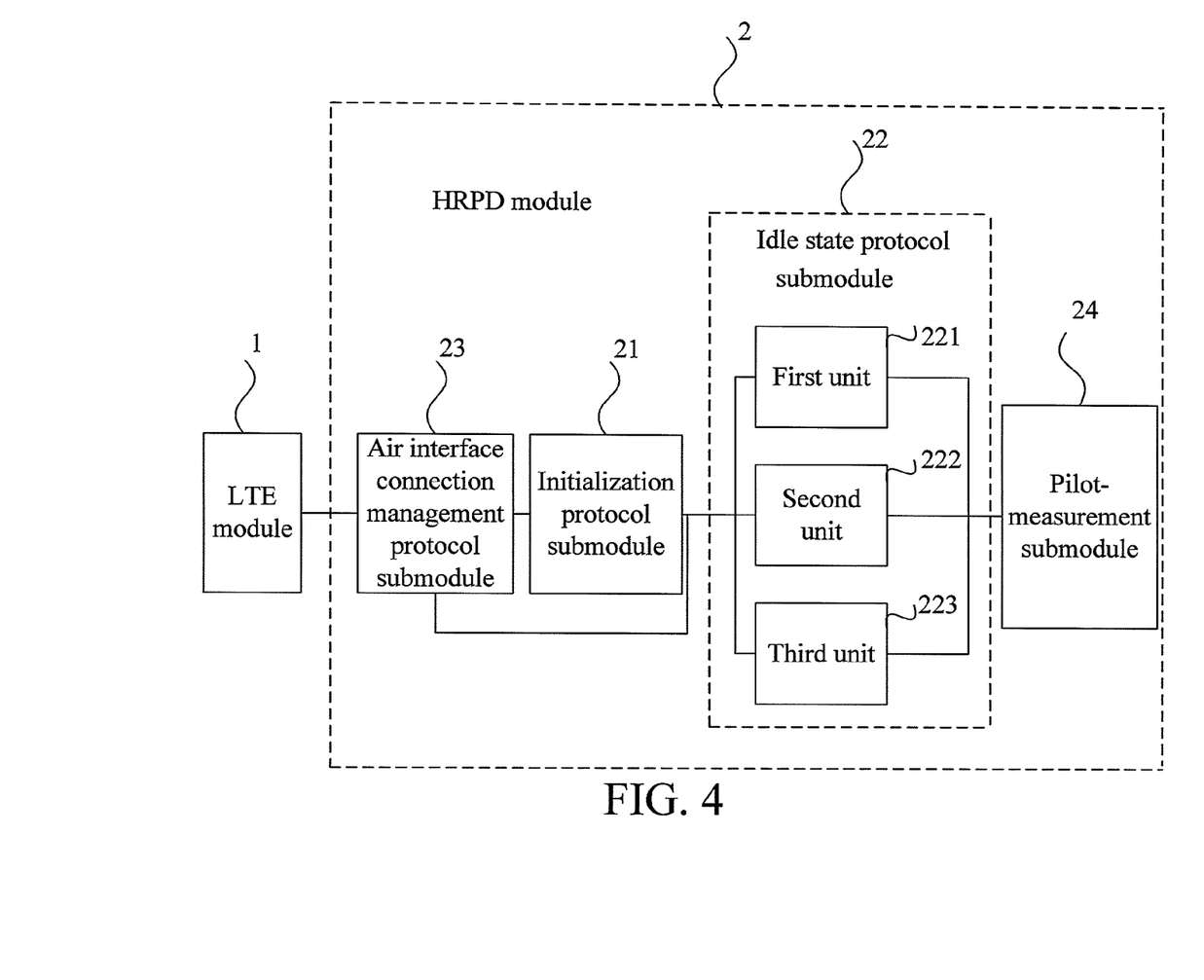
FIG. 4 is a schematic structural view of a dual-mode terminal according to an embodiment of the present invention.

FIG. 4 is a schematic structural view of a dual-mode terminal according to an embodiment of the present invention. As shown in FIG. 4, the dual-mode terminal includes a non-HRPD module and an HRPD module 2. The non-HRPD module may be a communication network functional module such as an LTE module, a WiMAX module, a UMTS module or a UMB module. In this embodiment, the LTE module is taken as an example for illustration. An LTE module 1 is configured to implement a wireless communication service of a terminal in an LTE network, and the HRPD module 2 is configured to implement a wireless communication service of the terminal in an HRPD network, so as to achieve communication of the same terminal in two networks. The HRPD module 2 includes an initialization protocol submodule 21, an idle state protocol submodule 22, and an air interface connection management protocol submodule 23. The initialization protocol submodule 21 is configured to send measurement indication information to the idle state protocol submodule 22 after receiving a measurement start command or a measurement stop command sent by the LTE module 1. The idle state protocol submodule 22 is configured to control pilot measurement after entering a tunnel state, by detecting HRPD measurement permission variable information, or by detecting measurement indication information stored in a buffer memory, or according to measurement indication information sent by the air interface connection management protocol submodule 23 in the HRPD module of the dual-mode terminal, where the measurement indication information is sent when the air interface connection management protocol submodule 23 activates the idle state protocol submodule 22. The air interface connection management protocol submodule 23 is configured to uniformly manage the idle state protocol submodule 22 and the initialization protocol submodule 21.

In a handover process of the dual-mode terminal from the LTE network to the HRPD network, after the HRPD module 2 completes pre-registration and completes initialization of an HRPD protocol, the initialization protocol submodule 21 completes network capture, and the idle state protocol submodule 22 enters the tunnel state, the idle state protocol submodule 22 can directly control pilot measurement by detecting the HRPD measurement permission variable information, or by detecting the buffered information, or according to the measurement indication information sent by the air interface connection management protocol submodule 23, without waiting for the measurement start information sent by the initialization protocol submodule 21, thereby ensuring normal network handover and improving the service quality.

The pilot measurement of the dual-mode terminal may be completed by a pilot-measurement submodule 24 in the HRPD module, and the pilot-measurement submodule 24 may perform pilot measurement under the control of the idle state protocol submodule 22.

In this embodiment, the idle state protocol submodule 22 may include one or a combination of a first unit 221, a second unit 222, and a third unit 223. The first unit 221 is configured to detect the HRPD measurement permission variable information and control pilot measurement according to a detection result. The initialization protocol submodule 21 immediately sets the HRPD measurement permission variable information to "1" after receiving the measurement start command sent by the LTE module. The first unit 221 learns that pilot measurement is permitted by detecting the HRPD measurement permission variable information and then controls the pilot-measurement submodule 24 to perform pilot measurement.

In addition, after the initialization protocol submodule 21 immediately sets the HRPD measurement permission variable information to "1" after receiving the measurement start command sent by the LTE module, the initialization protocol submodule 21 sends the measurement indication information to the idle state protocol submodule 22 to instruct the idle state protocol submodule 22 to control pilot measurement. The second unit 222 buffers the measurement indication information sent by the initialization protocol submodule 21, and controls pilot measurement according to the buffered measurement indication information after entering the tunnel state.

Moreover, the initialization protocol submodule 21 is further configured to send the HRPD measurement permission variable information to the air interface connection management protocol submodule 23 after receiving the measurement start command or measurement stop command sent by the LTE module 1. The HRPD module 2 enters an idle state, and the idle state protocol submodule 22 is activated and enters the tunnel state. When activating the idle state protocol submodule 22, the air interface connection management protocol submodule 23 sends the measurement indication information to the idle state protocol submodule 22 according to the HRPD measurement permission variable information previously submitted by the initialization protocol submodule 21. The third unit 223 receives the measurement indication information sent by the air interface connection management protocol submodule 23 and controls pilot measurement according to the measurement indication information.

In the dual-mode terminal provided in this embodiment, after entering the tunnel state, the idle state protocol submodule does not wait for the measurement start command to trigger pilot measurement, but instead, directly triggers pilot measurement by actively searching for the HRPD measurement permission variable information. Alternatively, the measurement indication information sent by the initialization protocol submodule is buffered in advance, so that after entering the tunnel state, the idle state protocol submodule can trigger pilot measurement by searching for the buffered information. Alternatively, the idle state protocol submodule performs pilot measurement according to the measurement indication information sent by the air interface connection management protocol submodule when the idle state protocol submodule is activated. Therefore, the following phenomenon may be prevented: The idle state protocol submodule of the HRPD module in the dual-mode terminal fails to perform pilot measurement after entering the tunnel state if the LTE module already sends the measurement start command but does not send a measurement stop command. This ensures that the idle state protocol submodule performs normal pilot measurement in the LTE-HRPD handover process of the dual-mode terminal, thereby increasing the handover success rate, ensuring normal operation of the system, and improving the service quality.

In an embodiment, the present invention further provides a pilot-measurement control device, which includes an HRPD module. In a network handover process of the pilot-measurement control device from a non-HRPD network to an HRPD network, after an idle state protocol submodule in the HRPD module of the pilot-measurement control device enters a tunnel state, the idle state protocol submodule is configured to control pilot measurement according to measurement identification information. The pilot-measurement control device provided in this embodiment may be a user mobile device such as a mobile terminal.

It should be noted that the above embodiments are merely provided for elaborating the technical solutions of the present invention, but not intended to limit the present invention. Although the present invention has been described in detail with reference to the foregoing embodiments, persons skilled in the art should understand that various modifications may be made to the technical solutions described in the above embodiments or equivalent replacements may be made for some technical features provided herein, and such modifications or replacements do not make the essence of the technical solutions depart from the scope of the invention.

What is claimed is:

1. A pilot-measurement control method comprising:
controlling, by an idle state protocol submodule, pilot measurement according to measurement identification information after the idle state protocol submodule enters a tunnel state,
wherein the idle state protocol submodule is in a high rate packet data (HRPD) module of a dual-mode terminal,
wherein the dual-mode terminal is in a network handover process from a non-HRPD network to an HRPD network, and
wherein controlling, by the idle state protocol submodule, the pilot measurement according to the measurement identification information comprises:
controlling, by the idle state protocol submodule, the pilot measurement by detecting HRPD measurement permission variable information; or
controlling, by the idle state protocol submodule, the pilot measurement by detecting measurement indication information stored in a buffer memory; or
controlling, by the idle state protocol submodule, the pilot measurement according to measurement indication information sent by an air interface connection management protocol submodule in the HRPD module of the dual-mode terminal, wherein the measurement indication information is sent when the air interface connection management protocol submodule activates the idle state protocol submodule.

2. The pilot-measurement control method according to claim 1, wherein controlling, by the idle state protocol submodule, the pilot measurement by detecting the HRPD measurement permission variable information comprises detecting, by the idle state protocol submodule, the HRPD measurement permission variable information, and if the HRPD measurement permission variable information indicates that measurement is permitted, enabling a pilot-measurement submodule in the HRPD module to perform the pilot measurement.

3. The pilot-measurement control method according to claim 1, wherein controlling, by the idle state protocol submodule, the pilot measurement by detecting the HRPD measurement permission variable information comprises detecting, by the idle state protocol submodule, the HRPD measurement permission variable information, and if the HRPD measurement permission variable information indicates that measurement is not permitted, disabling the pilot-measurement submodule to stop the pilot measurement.

4. The pilot-measurement control method according to claim 1, wherein controlling, by the idle state protocol submodule, the pilot measurement by detecting the measurement indication information stored in the buffer memory comprises detecting, by the idle state protocol submodule, the measurement indication information stored in the buffer memory, and if the measurement indication information indicates that measurement is permitted, enabling a pilot-measurement submodule in the HRPD module to perform the pilot measurement.

5. The pilot-measurement control method according to claim 4, wherein before the idle state protocol submodule enters the tunnel state, the method further comprises:
receiving, by the idle state protocol submodule, the measurement indication information that is sent by an initialization protocol submodule in the HRPD module of the dual-mode terminal or that is sent by the non-HRPD module of the dual-mode terminal; and
storing the measurement indication information in the buffer memory.

6. The pilot-measurement control method according to claim 1, wherein controlling, by the idle state protocol submodule, the pilot measurement by detecting the measurement indication information stored in the buffer memory comprises detecting, by the idle state protocol submodule, the measurement indication information stored in the buffer memory, and if the measurement indication information indicates that measurement is not permitted, disabling the pilot-measurement submodule to stop the pilot measurement.

7. The pilot-measurement control method according to claim 1, wherein controlling, by the idle state protocol submodule, the pilot measurement according to the measurement indication information sent by the air interface connection management protocol submodule in the HRPD module of the dual-mode terminal comprises detecting, by the idle state protocol submodule, the measurement indication information sent by the air interface connection management protocol submodule in the HRPD module of the dual-mode terminal, wherein the measurement indication information is sent when the air interface connection management protocol submodule activates the idle state protocol submodule, and if the measurement indication information indicates that measurement is permitted, enabling a pilot-measurement submodule in the HRPD module to perform the pilot measurement.

8. The pilot-measurement control method according to claim 7, wherein before controlling, by the idle state protocol submodule, the pilot measurement according to the measurement indication information sent by the air interface connection management protocol submodule in the HRPD module of the dual-mode terminal, the method further comprises:
sending, by the initialization protocol submodule in the HRPD module of the dual-mode terminal, the HRPD measurement permission variable information to the air interface connection management protocol submodule after receiving a measurement start command or a measurement stop command sent by the non-HRPD module of the dual-mode terminal; and
sending, by the air interface connection management protocol submodule, the measurement indication information to the idle state protocol submodule according to the HRPD measurement permission variable information when activating the idle state protocol submodule.

9. The pilot-measurement control method according to claim 1, wherein controlling, by the idle state protocol submodule, the pilot measurement according to the measurement indication information sent by the air interface connection management protocol submodule in the HRPD module of the dual-mode terminal comprises detecting, by the idle state protocol submodule, the measurement indication information sent by the air interface connection management protocol submodule in the HRPD module of the dual-mode terminal, wherein the measurement indication information is sent when the air interface connection management protocol submodule activates the idle state protocol submodule, and if the measurement indication information indicates that measurement is not permitted, disabling the pilot-measurement submodule to stop the pilot measurement.

10. A dual-mode terminal comprising:
a non-high rate packet data (HRPD) module; and
an HRPD module,
wherein the HRPD module comprises an idle state protocol submodule that is configured to control pilot measurement after entering a tunnel state by detecting HRPD measurement permission variable information, by detecting measurement indication information stored in a buffer memory, or according to measurement indication information sent by an air interface connection management protocol submodule in the HRPD module of the dual-mode terminal when the air interface connection management protocol submodule activates the idle state protocol submodule,
wherein the HRPD module further comprises a pilot-measurement submodule that is configured to perform the pilot measurement under the control of the idle state protocol submodule,
wherein the idle state protocol submodule comprises at least one of a first unit, a second unit, and a third unit,
wherein the first unit is configured to detect the HRPD measurement permission variable information and control the pilot measurement according to a detection result,
wherein the second unit is configured to buffer measurement indication information sent by an initialization protocol submodule and control the pilot measurement according to the buffered measurement indication information,
wherein the third unit is configured to receive the measurement indication information sent by the air interface connection management protocol submodule and control the pilot measurement according to the measurement indication information,
wherein the initialization protocol submodule is further configured to send the HRPD measurement permission variable information to the air interface connection management protocol submodule after receiving a measurement start command or a measurement stop command sent by the non-HRPD module, and
wherein the air interface connection management protocol submodule is further configured to send the measurement indication information to the idle state protocol submodule according to the HRPD measurement permission variable information when activating the idle state protocol submodule.

* * * * *